United States Patent
Arbel et al.

(10) Patent No.: US 9,660,313 B2
(45) Date of Patent: May 23, 2017

(54) METAL-AIR FUEL CELLS AND METHODS OF REMOVING SPENT FUEL THEREFROM

(71) Applicant: PHINERGY LTD., Lod (IL)

(72) Inventors: Avraham Arbel, Nechalim (IL); Jonathan R. Goldstein, Jerusalem (IL)

(73) Assignee: PHINERGY LTD., Lod (IL)

( * ) Notice: Subject to any disclaimer, the term of this patent is extended or adjusted under 35 U.S.C. 154(b) by 155 days.

(21) Appl. No.: 14/381,258

(22) PCT Filed: Feb. 27, 2013

(86) PCT No.: PCT/IL2013/050168
§ 371 (c)(1),
(2) Date: Aug. 27, 2014

(87) PCT Pub. No.: WO2013/128445
PCT Pub. Date: Sep. 6, 2013

(65) Prior Publication Data
US 2015/0118583 A1 Apr. 30, 2015

Related U.S. Application Data

(60) Provisional application No. 61/603,400, filed on Feb. 27, 2012.

(51) Int. Cl.
| | | |
|---|---|---|
| *H01M 12/08* | (2006.01) | |
| *H01M 2/36* | (2006.01) | |
| *H01M 12/06* | (2006.01) | |
| *H01M 10/42* | (2006.01) | |
| *H01M 6/50* | (2006.01) | |

(52) U.S. Cl.
CPC ............ *H01M 12/08* (2013.01); *H01M 2/36* (2013.01); *H01M 6/5077* (2013.01); *H01M 10/4242* (2013.01); *H01M 12/06* (2013.01); *Y02E 60/128* (2013.01)

(58) Field of Classification Search
CPC ........ H01M 12/08; H01M 12/06; H01M 2/36; H01M 10/4242; H01M 6/5077
See application file for complete search history.

(56) References Cited

U.S. PATENT DOCUMENTS

| 5,228,958 | A * | 7/1993 | Goldstein | ........... B60L 11/1874 |
| | | | | 205/602 |
| 6,573,008 | B1 * | 6/2003 | Hasvold | ................ H01M 12/06 |
| | | | | 429/206 |
| 2002/0142203 | A1* | 10/2002 | Ma | .......................... H01M 4/06 |
| | | | | 429/406 |
| 2010/0196768 | A1 | 8/2010 | Roberts | |

FOREIGN PATENT DOCUMENTS

| IL | WO 2011073975 A2 * | 6/2011 | ............ H02J 7/0052 |
| WO | WO 2011/073975 A2 | 6/2011 | |

OTHER PUBLICATIONS

Supplementary European Search Report issued for European Application No. 13755592.6 dated Oct. 9, 2015.
International Search Report for PCT Application No. PCT/IL2013/050168 mailed Jul. 10, 2013.

* cited by examiner

*Primary Examiner* — Karie O'Neill Apicella
(74) *Attorney, Agent, or Firm* — Pearl Cohen Zedek Latzer Baratz LLP

(57) ABSTRACT

This invention is directed to a metal-air electrochemical power sources, specifically zinc-air batteries and fuel cells, and methods for removing solid or semi-solid spent fuel using a thickener-liquefier pair.

23 Claims, 1 Drawing Sheet

1. Air electrode
2. Anode compartment
3. Anode current collector
4. Fuel inlet (fresh)
5. Fuel outlet
6. Liquifier inlet
7. Mechanical unload mechanism
8. Fresh fuel tank
9. Liquidizer tank
10. Used fuel tank

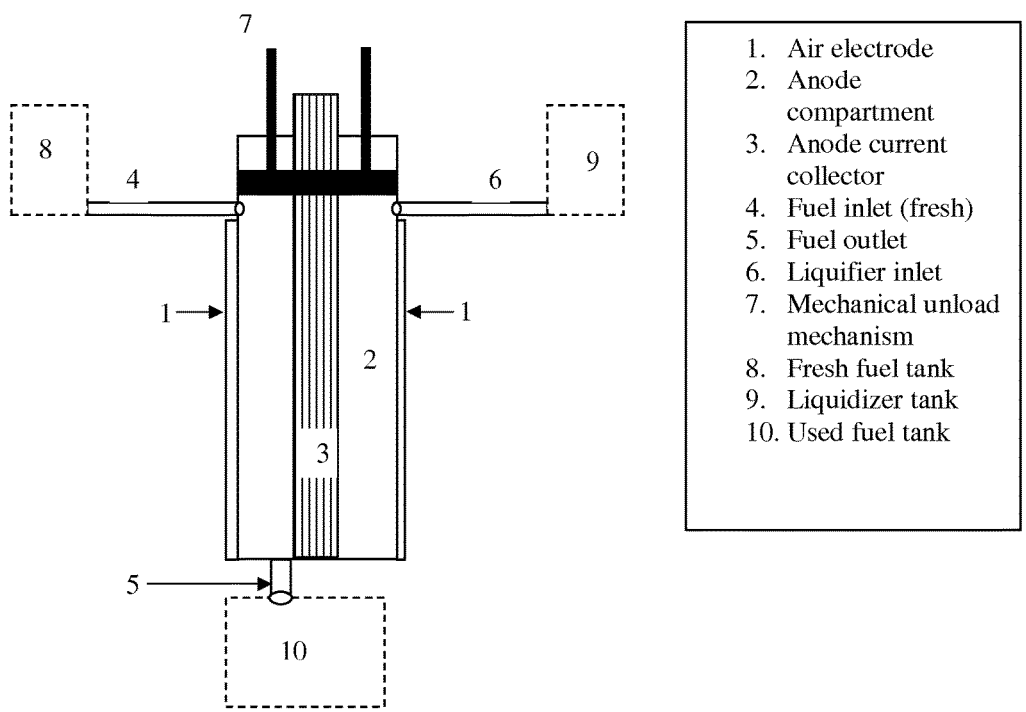

METAL-AIR FUEL CELLS AND METHODS OF REMOVING SPENT FUEL THEREFROM

CROSS-REFERENCE TO RELATED APPLICATIONS

This application is a National Phase Application of PCT International Application No. PCT/IL2013/050168, International Filing Date Feb. 27, 2013, claiming priority of U.S. Provisional Patent Application No. 61/603,400, filed Feb. 27, 2012, which is incorporated herein by reference.

FIELD OF THE INVENTION

This invention is directed to metal-air electrochemical power sources, specifically zinc-air fuel cells, methods of loading fresh metal-based fuel, and methods of removing spent metal-based fuel from these cells using a thickener-liquefier pair.

BACKGROUND OF THE INVENTION

Metal-air electrochemical power sources, specifically zinc-air batteries and fuel cells with alkaline electrolyte are suitable for electric vehicles, unmanned aerial vehicles (UAVs), reserve, emergency power supply and other applications.

Zinc-air batteries (non-rechargeable) and zinc-air fuel cells, (mechanically-rechargeable) are electrochemical batteries powered by oxidizing zinc with oxygen from the air. These batteries have high energy densities and are relatively inexpensive to produce. In operation, a mass of zinc particles forms a porous anode, which is saturated with an alkaline electrolyte. Oxygen from the air reacts at the cathode and forms hydroxyl ions which migrate into the zinc paste (anode) and form zincate $[Zn(OH)_4]^{2-}$, releasing electrons to travel via the external circuit to the cathode. The zincate decays into zinc oxide and water returns to the electrolyte. The water from the anode is recycled at the cathode, so the water is not consumed.

The overall cell reaction is:

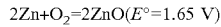

$$2Zn+O_2=2ZnO(E°=1.65 \text{ V})$$

where, E° is the standard potential for the reaction. Theoretical specific energy according to the overall reaction equation is 1,350 Wh kg$^{-1}$. The practical discharge voltage is about 1.15-1.05 V per cell depending on the current loading. Usually, current densities of 25-50 mA/cm$^2$ are withdrawn.

Zinc-air batteries have some properties of fuel cells: the zinc is the fuel, the reaction rate can be controlled by varying the air flow, and oxidized zinc/electrolyte paste can be replaced with fresh paste.

Rechargeable zinc-air cells present a difficult design problem since zinc deposition from the water-based electrolyte must be closely controlled. The problems are dendrite formation, non-uniform zinc dissolution and limited solubility in electrolytes. Electrically reversing the reaction at a bifunctional air cathode, to liberate oxygen from discharged reaction products, is difficult; air electrodes tested to date are not robust and have low overall efficiency. Charging voltage is much higher than discharge voltage, producing cycle energy efficiency as low as 50%. Providing charge and discharge functions by separate uni-functional cathodes, increases cell size, weight, and complexity. A satisfactory electrically recharged system potentially offers low material cost and high specific energy.

Rechargeable systems may mechanically replace the anode and electrolyte each cycle, essentially operating as a refurbishable primary cell, or may use zinc powder or other methods to replenish the reactants. Mechanical recharging systems have been researched for decades for use in electric vehicles. Some approaches use a large zinc-air battery to maintain charge on a high discharge-rate battery used for peak loads during acceleration. Zinc granules serve as the reactant. Vehicle battery exchange swapped electrolyte and depleted zinc for fresh reactants at a service station to recharge.

In order to mechanically recharge a zinc-air battery, the spent zinc fuel (e.g. zinc electrolyte paste or slurry), formed during the electrochemical reaction, mainly in the form of zinc oxide, has to be removed from the cell. However, the spent zinc fuel forms a solid or a semi solid "cake" in the cell, mainly comprised of zinc oxide waste. Removing this "cake" quickly is difficult, and the remaining "cake" may damage the rest of the cell. Particularly, the air electrode or the cell separator can be damaged during the removal process. Furthermore, the capacity of the zinc-air cell is bounded by the amount of zinc that can be placed in about a 3 mm thick layer, as larger thicknesses of zinc may not be discharged efficiently. Efficient removal of spent zinc fuel from zinc-air cells and loading fresh zinc fuel into the zinc-air cell, will enable performing multiple cycles of charge/discharge of a cell/battery where the energetic capacity of such a system will be determined by the amount of zinc fuel in the system.

SUMMARY OF THE INVENTION

In one embodiment, this invention provides a method of removing or reducing the concentration of solid or semi-solid spent fuel from a metal-air fuel-cell or battery, said method comprises addition of a liquefier to an anode compartment of said cell or battery, thereby, removing or reducing the concentration of said spent fuel.

In one embodiment, this invention provides a method of loading and unloading a metal-air fuel-cell, wherein said method comprises the following steps:
 (i) loading an anode compartment with metal fuel, electrolyte solution and a thickener agent, wherein said thickener agent forms a metal fuel gel in said compartment;
 (ii) electrochemically discharging the cell and forming solid and semi-solid spent fuel;
 (iii) adding a liquefier to said anode compartment, wherein said liquefier allows unloading of solid and semi-solid spent fuel; and
 (iv) repeating steps (i) to (iii);
wherein said liquefier is added prior to the electrochemically discharging step, during the discharging step or following the discharging step.

In one embodiment, this invention provides a metal-air fuel cell comprising:
 (i) an air electrode;
 (ii) an anode compartment comprising metal fuel;
 (iii) a current collector for the anode;
 (iv) a metal fuel inlet;
 (v) a liquefier inlet; and
 (vi) a spent metal fuel outlet.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

FIG. 1 is a schematic description of an electrochemical zinc-air cell according to the present invention, comprising an air electrode (1), an anode compartment for zinc fuel in gel formation (2), a current collector for the anode (3), fuel inlet (4), fuel outlet (5), liquefier inlet (6), optionally a mechanical device for unloading liquefied spent fuel such as an unload piston (7), optionally a fresh fuel tank (8), optionally a liquefier tank (9); and optionally a spent fuel tank (10) for temporary storage of spent fuel, wherein the fresh fuel flows into the cell through the fuel inlet (4); and the liquefier flows into the cell through the liquefier inlet (6).

DETAILED DESCRIPTION OF THE INVENTION

In one embodiment, this invention is directed to a metal-air fuel cell or battery as an electrochemical power source.

Metal-air cells or batteries are very attractive power sources in light of their potential high energy density. In this type of cell the oxidizing reactant (oxygen) which undergoes reduction during discharge is supplied from outside the cell as air. This reaction of oxygen reduction occurs in the presence of water and gives hydroxide ions ($OH^-$). The oxygen is reduced on the surface of the cathode during discharge.

In one embodiment, a "battery" is synonymous with a "cell". In one embodiment, a "battery" comprises more than one cell. In one embodiment, a battery comprises at least two "cells". In one embodiment, a battery is formed by connecting certain number of single cells in series or in parallel. In one embodiment, capacity and energy values associated with a battery are a function of the number of cells forming the battery. In one embodiment, capacity and energy values associated with the battery are a function of the configuration of the cells in the battery. In another embodiment, this invention is directed to electrochemical cells and batteries. Any reference to a cell of this invention may be applied to a battery.

In one embodiment, the metal-air electrochemical cell of this invention and methods of use thereof include a zinc-air cell (i.e. Zn-air cell). In another embodiment, the metal-air cell is an aluminum-air cell (i.e. Al-air cell). In another embodiment, the metal-air cell is a magnesium-air cell (i.e. Mg-air cell). In another embodiment, the metal-air cell is a lithium-air cell (i.e. Li-air cell). In another embodiment, the electrolyte in a metal-air cell may be non-alkaline. In another embodiment, the metal-air cell, in which the electrolyte may be non-alkaline, is a Mg-air cell. In another embodiment, the metal air cell, in which the electrolyte may be non-alkaline, and preferably non-aqueous, is a Li-air cell.

In one embodiment, the metal-air electrochemical cell of this invention and methods of use thereof include an anode and an air cathode. In another embodiment, the anode is selected from the group consisting of iron, zinc, magnesium, lithium, aluminum, alloys of these metals, and mixtures thereof. In another embodiment, the anode is zinc. In another embodiment, the anode is aluminum.

In one embodiment, this invention provides a metal-air fuel cell comprising:
 (i) an air electrode;
 (ii) an anode compartment comprising metal-fuel;
 (iii) a current collector for the anode;
 (iv) a metal-fuel inlet;
 (v) a liquefier inlet; and
 (vi) a spent metal fuel outlet.

In one embodiment, this invention provides a metal-air fuel cell, wherein the cell further comprises a fuel tank with fresh metal fuel. In another embodiment, the cell further comprises a liquefier tank. In another embodiment, the cell further comprises a spent fuel tank for storing spent metal fuel. In another embodiment, the cell further comprises a mechanical device for unloading liquefied spent fuel. In another embodiment, the fuel cell optionally further comprises a fuel tank, a liquefier tank, a spent fuel tank; a mechanical device for unloading liquefied spent fuel or any combination thereof. In one embodiment, the fuel tank, liquefier tank, spent fuel tank, mechanical device for unloading liquefied spent fuel or any combination thereof are attached to the cell or are separated units from the cell.

In one embodiment, this invention is directed to a metal-air cell. In one embodiment, this invention is directed to a zinc-air cell. In one embodiment the metal anode (or zinc anode) faces an air electrode.

In one embodiment, the cell and methods of this invention comprises or make use of a current collector. In one embodiment, a "current collector" is an inert conducting material that is in contact with the cathode and/or anode. The current collector whether for anode or for cathode is used to pass current from the cathode, via the external circuit to the anode and/or to pass electrons from the anode to the cathode through a load in a discharge mode.

In one embodiment, the methods of this invention and the metal air cell composition comprise and make use of a loading composition. The loading composition comprises metal-fuel, a thickening agent and an electrolyte solution. In another embodiment, the loading composition is in the form of a gel that can be forced to flow into the cell. In another embodiment, the metal is iron, zinc, magnesium, lithium, aluminum, alloys of these metals, or combination thereof. In one embodiment, the an anode compartment comprises the loading composition.

The term "spent fuel" refers to metal electrolyte paste, formed during the electrochemical reaction, mainly in the form of metal oxide. This paste has to be removed from the cell. However, the spent metal fuel forms a solid or a semi solid "cake" in the cell, mainly comprised of metal oxide waste.

In another embodiment, this invention is directed to a metal-air cell or battery, as described in FIG. 1. The cell comprises an air electrode (1), an anode compartment for loading composition in gel formation (2), a current collector for the anode (3), fuel inlet (4), fuel outlet (5), liquefier inlet (6), optionally a mechanical device for unloading liquefied spent fuel such as an unload piston (7), optionally a fresh fuel tank (8), optionally a liquefier tank (9); and optionally a spent fuel tank (10) for temporary storage of spent fuel, wherein the fresh fuel flows into the cell through the fuel inlet (4); and the liquefier flows into the cell through the liquefier inlet (6).

In one embodiment, the cell and methods of this invention include or make use of metal fuel. In one embodiment, the metal fuel is zinc fuel. In another embodiment, the metal fuel is zinc in a powder form. In another embodiment, the loading composition comprises zinc in a powder form, a thickening agent and an electrolyte. In another embodiment, the loading composition is in the form of a gel that can be forced to flow into the cell.

In one embodiment, the cell and methods of this invention include or make use of a loading composition, wherein the loading composition includes a thickening agent. The thickening agent (or thickener) used in this invention increases the viscosity of the electrolyte. In another embodiment, the thickening agent is a gelling agent. Gelling agents encompassed by the present invention include but are not limited to: organic gelling agents and inorganic gelling agents. Organic gelling agents encompassed by the present invention include but are not limited to: polyacrylic acid based gelling agents (carbopol), starch, polyvinyl alcohol, carboxymethylcellulose, a cross-linked polymer gelator and an ethylene maleic anhydride copolymer. Inorganic gelling agents encompassed by the present invention include but are not limited to minerals such as sepiolite, bentonite, hectorite, perlite, vermiculite and attapulgite.

In another embodiment, the thickening agent of the metal-air fuel cell or battery of this invention is carbopol.

In one embodiment, the cell and methods of this invention include or make use of a liquefier. The term "liquefier" refers to a material, such as a thinner, that is capable of disintegrating the solid structure of the spent metal-fuel precipitate, such that the spent fuel can flow out of the cell with minimal or no mechanical force applied to it, without damaging the cell or any of its components. In one embodiment, the liquefier is a peroxide solution. In another embodiment, the peroxide solution is hydrogen peroxide. In one embodiment the liquefier is a hydrogen peroxide precursor. Examples for hydrogen peroxide precursors include but are not limited to: sodium perborate, potassium perborate, sodium persulfate and potassium persulfate. In one embodiment, the decomposition products from liquefying using hydrogen peroxide precursors are removable by washing.

In another embodiment, the peroxide is an inorganic peroxide. In one embodiment, the peroxide is organic. Organic peroxides include but are not limited to: peroxy acids, such as peracetic acid; and organic hydroperoxides such as tert-butyl hydroperoxide, dibenzoyl, cumene hydroperoxide, and di-tert-butyl peroxide. In another embodiment, the peroxide is an inorganic peroxide. Inorganic peroxides include but are not limited to: ammonium peroxydisulfate, sodium peroxide ($Na_2O_2$), and barium peroxide ($BaO_2$). In another embodiment, the hydrogen peroxide solution is at a concentration of between about 0.01% and 50% wt/wt. In another embodiment, the hydrogen peroxide solution is at a concentration of between about 2% and 30% wt/wt. In another embodiment, hydrogen peroxide solution is added to the fuel cell or battery at an amount of between about 0.1 micro liter to 1000 ml per 1 gr of said solid or semi-solid spent fuel. In another embodiment hydrogen peroxide solution is added to the fuel cell or battery at an amount of between about 0.2 micro liter to 10 ml per 1 gr of said solid or semi-solid spent fuel. In another embodiment hydrogen peroxide solution is added to the fuel cell or battery at an amount of between about 0.1 ml to 10 ml per 1 gr of said solid or semi-solid spent fuel.

In one embodiment, the loading composition of this invention includes an electrolyte. In another embodiment, the electrolyte is an alkaline electrolyte. In another embodiment, the alkaline electrolyte is sodium hydroxide. In another embodiment, the alkaline electrolyte is potassium hydroxide. In one embodiment, the concentration of the hydroxide ion in the electrolyte is between about 1 wt % and 45 wt %. In one embodiment, the concentration of the hydroxide ion in the electrolyte is between about 20 wt % and 30 wt % wt. In one embodiment, the concentration of the hydroxide ion in the electrolyte is about 25 wt %.

In one embodiment, the metal-air cell or battery is a Zn-air cell wherein the overall process of current generation for Zn-air cell or battery with alkaline electrolyte is presented as follows:

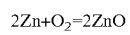

In one embodiment, this invention is directed to a method of removing or reducing the concentration of solid or semi-solid spent fuel from a metal-air fuel-cell comprising addition of a liquefier to an anode compartment of said cell or battery, thereby, removing or reducing the concentration of said spent fuel.

In one embodiment, the metal is zinc. In one embodiment, the spent fuel is formed in the zinc compartment. In one embodiment, the liquefier is peroxide solution. In one embodiment, the peroxide solution is hydrogen peroxide solution. In one embodiment, the peroxide solution is at a concentration of between about 0.01% to 50% wt/wt. In one embodiment, the hydrogen peroxide solution is an alkaline solution. In one embodiment, the hydrogen peroxide solution is added to the fuel cell or battery at an amount of between about 0.1 microliter to 1000 ml per 1 gr of said solid or semi-solid spent fuel. In another embodiment, the liquefier is peroxide precursor. In one embodiment, the peroxide precursor is sodium perborate, potassium perborate, sodium persulfate, potassium persulfate or any combination thereof.

In one embodiment, this invention is directed to a method of loading and unloading a metal-air fuel-cell, wherein said method comprises the following steps:
  (i) loading an anode compartment with metal-fuel, electrolyte solution and a thickening agent, wherein said thickening agent forms a metal fuel gel in said compartment;
  (ii) electrochemical discharging the cell and forming solid and semi-solid spent fuel;
  (iii) adding a liquefier to said anode compartment, wherein said liquefier allows unloading of solid and semi-solid spent fuel; and
  (iv) repeating steps (i) to (iii);
wherein said liquefier is added prior to the electrochemical discharging step, during the discharging step or following the discharging step.

In one embodiment, this invention is directed to a method of reversible loading and unloading a metal-air fuel-cell, wherein said method comprises the following steps:
  (i) loading an anode compartment with metal-fuel, electrolyte solution and a thickening agent, wherein said thickening agent forms a metal fuel gel in said compartment;
  (ii) electrochemical discharging the cell and forming solid and semi-solid spent fuel;
  (iii) adding a liquefier to said anode compartment, wherein said liquefier allows unloading of solid and semi-solid spent fuel; and
  (iv) repeating steps (i) to (iii);
wherein said liquefier is added prior to the electrochemical discharging step, during the discharging step or following the discharging step.

In one embodiment the metal is zinc. In one embodiment, the metal-fuel in the anode compartment is reversibly electrochemically generated. In one embodiment, the thickening agent is starch, polyvinyl alcohol, poly(acrylic acid), carboxymethylcellulose, a cross-linked polymer gelator, ethylene maleic anhydride copolymer or any combination thereof. In one embodiment, the poly(acrylic acid) is carbopol. In one embodiment, the liquefier is hydrogen peroxide. In one embodiment, the liquefier is a hydrogen peroxide precursor. In one embodiment, the hydrogen peroxide precursor is sodium perborate, potassium perborate, sodium persulfate, potassium persulfate or any combination thereof.

In one embodiment, this invention is directed to a metal-air fuel cell comprising:
  i. an air electrode;
  ii. an anode compartment comprising metal-fuel;
  iii. a current collector for the anode;
  iv. a metal-fuel inlet;
  v. a liquefier inlet; and
  vi. a spent metal fuel outlet.

In one embodiment, the cell further comprises a fuel tank, a liquefier tank, a spent fuel tank; a mechanical device for unloading liquefied spent fuel or any combination thereof. In another embodiment, the metal-fuel is in a gel form. In one embodiment, the metal is zinc. In another embodiment, the anode compartment comprises a gel electrolyte, which comprises a thickening agent. In another embodiment, the thickening agent is a poly(acrylic acid). In another embodiment, the loading composition comprises a zinc powder, an alkaline electrolyte and a thickening agent. In another embodiment, the metal fuel in the anode compartment is reversibly electrochemically generated.

In one embodiment, this invention is directed to a method for loading fresh metal based fuel into a metal-air fuel cell or battery, wherein said fuel is loaded into the cell or battery as a mixture of a metal in particulate form, a thickening agent, and an alkaline solution.

In one embodiment the loading composition for the cell of this invention comprises a zinc powder, an alkaline electrolyte and a thickening agent. In one embodiment, the loading composition of a zinc based fuel for a zinc-air cell is zinc powder, KOH electrolyte and a carbopol thickening agent. In one embodiment, the loading composition of a zinc based fuel for a zinc-air cell is zinc powder (70 wt %), alkaline electrolyte comprising aqueous 45 wt % KOH (29 wt %) and thickening agent carbopol (1 wt %).

In one embodiment, the methods of this invention are directed to loading metal based fuel to a metal-air cell, reducing or removing spent fuel from a metal-air cell and to repeated loading and unloading of a metal-air fuel-cell. In one embodiment, the metal-air cell is a zinc-air cell (i.e. Zn-air cell). In another embodiment, the metal-air cell is an aluminum-air cell (i.e. Al-air cell). In another embodiment, the metal-air cell is a magnesium-air cell (i.e. Mg-air cell). In another embodiment, the metal-air cell is a lithium-air cell (i.e. Li-air cell).

In one embodiment, the methods of this invention comprise an electrochemical discharging step. In one embodiment, after the metal-fuel is discharged in the cell, part of it precipitates or becomes stiff, and cannot flow anymore. This solid or a semi solid "cake" in the cell is mainly comprised of metal oxide waste and a thickening agent. Removing this "cake" quickly is difficult, and the remaining "cake" may damage the rest of the cell. Particularly, the air electrode can be damaged during the removal process. In another embodiment, the metal fuel is zinc fuel. In another embodiment zinc oxide is formed during the electrochemical discharging step.

Thus, in one embodiment, this invention provides a method for removing or reducing the concentration of the solid or semi-solid spent fuel "cake" from a metal-air fuel cell or battery, comprising the addition of a liquefier to said cell or battery. In one embodiment, the metal is zinc. In another embodiment the liquefier is added to the anode compartment of said cell or battery. In another embodiment, the liquefier does not change the chemical structure of the metal oxide formed in the metal-air cell or battery during the electrochemical reaction.

The term "cake" refers to electrochemical discharge products which are present at a solid or semi-solid precipitate or gel in the cell. This cake is mainly comprised of metal oxide (i.e. zinc oxide) material and a thickening agent.

The phrase "loading/unloading cycle of a cell/battery" refers to unloading the cell/battery spent zinc fuel "cake" and re-loading fresh zinc fuel (loading composition) into the cell/battery from a fresh zinc fuel reservoir.

The phrase "loading/unloading cycle of a system" refers to refilling fresh zinc fuel in a tank (reservoir) outside the cell and removing the spent zinc fuel (waste).

In one embodiment, this invention is directed to a method of loading fresh metal based loading composition to a metal-air fuel cell or battery, particularly zinc fuel, and method for removing spent metal based fuel, particularly spent zinc fuel, from the anode chamber of a metal-air cell, particularly zinc-air cell, said method comprises the addition of a liquefier, particularly hydrogen peroxide, to the spent metal fuel.

Other methods for using zinc fuel in mechanically rechargeable zinc-air cells have a limited utilization of the zinc fuel due to the complications of removing the spent zinc fuel "cake". In the described system, zinc fuel can be better utilized, and still be removed from the cell by using the matching liquefier.

According to this invention, the loading composition is loaded into the cell in a form of mixture of a metal, a thickener, and an alkaline solution. The spent fuel is in a semi-solid cake form, and is a mixture of metal oxide, alkaline solution, thickener, as well as unreacted metal particles. The addition of a matching liquefier to the spent fuel enables an easy removal of the spent zinc fuel.

In one embodiment, the cell and methods of loading metal based fuel (loading composition), reducing the concentration of or removing spent fuel and repeated loading and unloading a metal-air fuel-cell include and make use of a liquefier. In one embodiment, the liquefier is hydrogen peroxide. In one embodiment, when carbopol based gels are used, the hydrogen peroxide is impacting the solid cake structure in one or more of the following manners:

1. Dissolving of a trapped thickening agent present in the metal fuel (i.e. zinc fuel). The carboxylic moieties of the polyacrylic acid (carbopol) thickening agent transform into their corresponding anionic form (carboxylate) in the alkaline solution of the electrolyte. Addition of peroxide causes the hydrogenation of the carboxylate groups into dissolvable species. The solvation of the thickening agent allows the disintegration of the solid or semi-solid spent fuel "cake".

2. Changing the local pH surrounding the metal-oxide (i.e. zinc oxide) particle interface from alkaline to slightly acidic, allowing local dissolution of some metal oxide at the interface, which breaks the integrity of the solid or semi-solid spent fuel "cake" into a "running" fluid.

3. Hydrogen peroxide manifests cavitation processes on the interface of each metal-oxide (i.e. zinc-oxide) particle. Such process, aided by in-situ release of oxygen gas from decomposing peroxide, breaks the physically bonded particle, and accordingly breaks the integrity of the solid or semi-solid spent fuel "cake".

In one embodiment, the methods of this invention comprise a liquefier. In another embodiment, the liquefier is a peroxide solution. In another embodiment, the liquefier is a hydrogen peroxide solution. In another embodiment, the solution is aqueous solution. In another embodiment, the solution is alkaline solution. In another embodiment, the alkaline solution is an aqueous solution which contains hydroxide anions. In another embodiment, the hydrogen peroxide concentration in the solution is between about 0.01 wt % to 50 wt %. In another embodiment, the hydrogen peroxide concentration in the solution is between about 0.1 wt % to 1 wt %. In another embodiment, the hydrogen peroxide concentration in the solution is between about 1% to 10% wt %. In another embodiment, the hydrogen peroxide concentration in the solution is between about 10 wt % to 30 wt %. In another embodiment, the hydrogen peroxide concentration in the solution is between about 20 wt % to 40 wt %. In another embodiment, the hydrogen peroxide concentration in the solution is between about 30 wt % to 50 wt %. In another embodiment, the amount of peroxide solution added to the solid or semi-solid cake, is from 0.1 micro liter to 1000 ml per 1 gr of said cake.

In another embodiment, the liquefier is a hydrogen peroxide precursor. Examples of hydrogen peroxide precursors include but are not limited to: sodium perborate, potassium perborate, sodium persulfate and potassium persulfate.

In one embodiment, the peroxide solution of this invention is added to the fuel cell or battery of this invention in an amount of between about 0.1 micro liter to 1000 ml per 1 gram of solid or semi-solid spent fuel "cake". In another embodiment, the peroxide is added in an amount of between 0.2 micro liter to 10 ml per 1 gr of said solid or semi-solid spent fuel cake. In another embodiment, the peroxide is added in an amount of between 0.1 ml to 10 ml per 1 gr of said solid or semi-solid spent fuel cake. In another embodiment, the peroxide is added in an amount of between 5 ml to 20 ml per 1 gr of said solid or semi-solid spent fuel cake. In another embodiment, the peroxide is added in an amount of between 5 ml to 10 ml per 1 gr of said solid or semi-solid spent fuel cake. In another embodiment, the peroxide solution of this invention is added to the fuel cell or battery of this invention in an amount of between about 0.1 micro liter to 1 ml per 1 gram of solid or semi-solid spent fuel "cake". In another embodiment, the peroxide solution of this invention is added to the fuel cell or battery of this invention in an amount of between about 1 ml to 100 ml per 1 gram of solid or semi-solid spent fuel "cake". In another embodiment, the peroxide solution of this invention is added to the fuel cell or battery of this invention in an amount of between about 100 ml to 1000 ml per 1 gram of solid or semi-solid spent fuel "cake". In another embodiment, the peroxide solution of this invention is added to the fuel cell or battery of this invention in an amount of between about 200 ml to 500 ml per 1 gram of solid or semi-solid spent fuel "cake"

In another embodiment, the peroxide solution is added to the fuel cell or battery of this invention during the battery discharge. In another embodiment, the peroxide solution is added to the fuel cell or battery of this invention prior to the battery discharge.

In one embodiment, the metal-air fuel-cell or battery anode comprises a gel electrolyte. In another embodiment the metal is zinc. In another embodiment, the gel electrolyte comprises a gelling agent.

According to one aspect of this invention, the phrase "gelling agents" refer to "thickening agents" and vise versa. "Thickening agents", or thickeners, is the term applied to substances which increase the viscosity of a solution or liquid/solid mixture without substantially modifying its other properties. Thickeners may also improve the suspension of other ingredients or emulsions which increases the stability of the product. Some thickening agents are gelling agents (gellants), forming a gel, dissolving in the liquid phase as a colloid mixture that forms a weakly cohesive internal structure.

Gelling agents encompassed by the present invention include but are not limited to: organic gelling agents and inorganic gelling agents. Organic gelling agents encompassed by the present invention include but are not limited to: polyacrylic acid based gelling agents (carbopol), starch, polyvinyl alcohol, carboxymethyl cellulose, a cross-linked polymer gelator, and ethylene maleic anhydride copolymers. Inorganic gelling agents encompassed by the present invention include but are not limited to minerals such as sepiolite, bentonite, hectorite, perlite, vermiculite and attapulgite. In another embodiment, the gelling agent (thickener) is a polyacrylic acid based gelling agent. In another embodiment, the gelling agent (thickener) is carbopol. In another embodiment the gelling agent (thickener) is starch, polyvinyl alcohol, carboxymethyl cellulose, ethylene maleic anhydride copolymers, a cross-linked polymer gelator, or any combination thereof.

In another embodiment, the metal-air fuel cell or battery anode can be reversibly electrochemically generated. In another embodiment, the anode can be reversibly electrochemically generated in the anode compartment. In another embodiment, the anode can be reversibly electrochemically generated at an external location.

In another embodiment, the metal-air fuel cell or battery anode can be loaded mechanically with a gel comprising zinc powder, a thickening agent and an alkaline electrolyte. In another embodiment, the anode can be loaded mechanically with a gel comprising a gelling agent and a zinc powder. In anther embodiment, the anode can be loaded mechanically with zinc powder.

In one embodiment, the method of repeated loading and unloading a metal-air fuel cell comprising the use of a thickener-liquefier pair. The thickening agent is used for creating the metal fuel by mixing with metal particles and an alkaline solution. After electrochemical discharging the metal fuel, it becomes solid, where most of the metal has oxidized, and some of the metal remains. The liquefier causes a transformation of the spent fuel from a solid phase to a gel-like-semi-liquid phase, allowing an easy unloading of the anode cell compartment. In another embodiment, the metal is zinc.

In another embodiment, this invention is directed to methods of removing or reducing the concentration of solid or semi-solid spent fuel from a metal-air fuel cell or battery, using a liquefier. In another embodiment, the metal is zinc. In another embodiment, the metal fuel is in a gel form. In another embodiment, the liquefier is peroxide solution. In another embodiment, the liquefier is hydrogen peroxide solution. In another embodiment the liquefier is a hydrogen peroxide precursor. Examples for hydrogen peroxide precursors include, but are not limited to: sodium perborate, potassium perborate, sodium persulfate and potassium persulfate. In another embodiment, the liquefier is added to the anode compartment of the metal-air cell or battery. In another embodiment, the liquefier does not change the chemical structure of the metal oxide formed during the electrochemical reaction in the metal-air cell or battery.

In another embodiment, the spent fuel "cake" comprises metal oxide. In another embodiment, the spent fuel "cake" comprises a thickening agent. In another embodiment, the spent fuel "cake" comprises alkaline solution. In another embodiment, the spent fuel "cake" comprises unreacted metal particles. In another embodiment, the spent fuel "cake" comprises metal hydroxide. In another embodiment, the spent fuel "cake" comprises zinc oxide. In another embodiment, the spent fuel "cake" comprises metal oxide, metal hydroxide, a thickening agent, alkaline solution, unreacted metal particles, or any combination thereof.

In another embodiment, the spent fuel comprises metal oxide precipitate. In another embodiment, the spent fuel comprises metal oxide gel.

Thus, in one embodiment, this invention provides methods of removing or reducing the concentration of metal oxide precipitate/gel formed in a metal-air electrochemical cell during an electrochemical reaction, comprising the addition of a liquefier to said cell. In another embodiment, the precipitate or gel is formed in the anode compartment of the cell. In one embodiment the precipitate or gel is formed in the circulated alkaline electrolyte.

In one embodiment, the liquefier impacts the solid or semi-solid spent fuel "cake" structure by dissolving or partially dissolving a trapped thickening agent present in the zinc fuel, which allows the disintegration of the spent fuel solid or semi-solid cake. In another embodiment, the liquefier impacts the solid or semi-solid spent fuel "cake" structure by changing the local pH surrounding the zinc oxide particle interface from alkaline to slightly acidic, allowing local dissolution of some zinc oxide at the interface, which breaks the integrity of the solid or semi-solid cake into a "running" fluid. In another embodiment, the liquefier impacts the solid or semi-solid spent fuel "cake" structure by manifesting cavitation processes at the interfaces of each zinc oxide particle, aided by in-situ release of oxygen gas from the decomposing peroxide, which breaks the physically bonded particle and the integrity of the solid spent fuel cake accordingly. In another embodiment, the thickening agent is carbopol.

In another embodiment, this invention is directed to methods of breaking the integrity of solid or semi-solid spent fuel "cake" in a metal-air fuel cell or battery, said method comprises the addition of a liquefier, to said cell or battery. In another embodiment, the metal is zinc. In another embodiment, the liquefier is peroxide solution. In another embodiment, the liquefier is hydrogen peroxide solution. In another embodiment, the liquefier is a hydrogen peroxide precursor. In another embodiment, the liquefier is added to the anode compartment of the metal-air cell or battery. In another embodiment, the liquefier does not change the chemical structure of the metal oxide formed during the electrochemical reaction in the metal-air cell or battery.

In one embodiment, the present invention is directed to an operating system comprising a metal-air fuel cell or battery. In one embodiment, the operating system is placed in a battery reload station for electric vehicles. In another embodiment, the metal is zinc.

According to one embodiment of this invention, the system operates in a single load mode.

In a single load mode of operation, a fresh fuel tank, a liquefier tank, and a spent fuel tank are not included in the system. At the initial state of the system the anode chamber in the cell is empty. The operation of such a system is as follows (FIG. 1):
  i. fresh metal fuel flows into the cell through the fuel inlet (4);
  ii. the fuel is discharged in the metal-air cell, where current is drawn from the air electrode (1) and the anode current collector (3);
  iii. liquefier flows into the cell through the liquefier inlet (6);
  iv. liquefaction of solid and semi-solid spent fuel takes place;
  v. the fuel outlet (5) opens, and the liquefied spent fuel flows out of the cell and out of the system to the reload station. Optionally, a mechanical force, such as a downward moving piston (7), is applied to the liquefied fuel for quicker removal of the spent fuel;
  vi. steps (i) to (v) are repeated.

According to another embodiment of this invention, the system operates in a multiple load mode (FIG. 1).

In a multiple load mode of operation, the system includes a fresh fuel tank (8), a liquefier tank (9), and a spent fuel tank (10). In the initial state of the system the anode chamber in the cell and the tanks are empty. The operation of such a system is as follows:
  i the fresh fuel tank (8) is filled with fresh fuel, and the liquefier tank (9) is filled with a matching liquefier. The amount of liquefier corresponds to the amount of fresh fuel that is filled in the fuel tank. The spent fuel tank (10) is emptied;
  ii the cell is filled with fresh fuel from the fresh fuel tank (8) through the fresh fuel inlet (4);
  iii the fuel is discharged in the metal-air cell, where current is drawn from the air electrode (1) and the anode current collector (3);
  iv liquefier flows into the cell from the liquefier tank (9) through the liquefier inlet (6);
  v liquefaction of solid and semi-solid spent fuel takes place;
  vi the fuel outlet (5) opens, and the liquefied spent fuel flows out of the cell into the spent fuel tank (10). Optionally, a mechanical force, such as a downward moving piston (7) or other pumping means, is applied to the liquefied fuel for quicker removal of the spent fuel;
  vii steps (ii) to (vi) are repeated until no fresh fuel remains in the fresh fuel tank (8);
  viii steps (i) to (vii) are repeated.

In one embodiment, the metal fuel that is used in the system may be prepared "on-demand". That is, the metal, the electrolyte, and the thickening agent may be mixed together just before fresh fuel has to be loaded into the cells. This way, there is no corrosion of the metal fuel before it is loaded into the cell. In another embodiment, the metal is zinc.

In one embodiment, the term "a" or "one" or "an" refers to at least one. In one embodiment the phrase "two or more" may be of any denomination, which will suit a particular purpose. In one embodiment, "about" or "approximately" or "roughly" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

The following examples are presented in order to more fully illustrate the preferred embodiments of the invention. They should in no way be construed, however, as limiting the broad scope of the invention.

EXAMPLES

Example 1

A Thickener-Liquefier Pair for Removing Spent Solid or Semi-Solid Fuel from the Anode Compartment in a Zn-Air Cell A zinc-air cell anode compartment was filled with 8 g gel zinc fuel, which included zinc powder, electrolyte solution, and carbopol as a thickening agent and could provide 5 Ah discharge capacity. The cell was discharged, the spent zinc fuel formed a semi-solid "cake". A few drops (1 cc) of 10 wt % hydrogen peroxide were added to the spent zinc fuel after cell discharge was completed and caused a transformation of the "cake" from a solid or semi-solid phase to a gel-like semi-liquid phase, allowing an easy clearance of the anode cell compartment without the application of extreme mechanical means, such as crushing or application of impractical time-consuming means such as dissolution.

Addition of hydrogen peroxide to the spent zinc fuel liquefied the spent fuel "cake" without changing the chemical structure of the zinc oxide.

The use of a carbopol—hydrogen peroxide (thickener-liquefier pair) was advantageous since the liquidation process did not change or modify the chemical structure of the spent zinc fuel and accordingly did not change or modify the chemical nature of the cell. Therefore, after liquidation took place, no leftovers of any material remained in the system, except water generated after the hydrogen peroxide addition. This allows the simple recovery of zinc metal fuel by external/internal electrochemical processing.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of removing or reducing the concentration of solid or semi-solid spent fuel from a metal-air fuel-cell or battery, said method comprising addition of a liquefier to an anode compartment of said cell or battery, thereby removing or reducing the concentration of said spent fuel, and wherein said liquefier comprises peroxide solution or peroxide precursor.

2. The method of claim 1, wherein said metal is zinc.

3. The method of claim 2, wherein said spent fuel is formed in said anode compartment.

4. The method according to claim 1, wherein said peroxide solution comprises hydrogen peroxide solution.

5. The method according to claim 4, wherein said hydrogen peroxide solution is at a concentration of between about 0.01% to 50% wt/wt.

6. The method according to claim 4, wherein said solution is an alkaline solution.

7. The method according to claim 4, wherein said hydrogen peroxide solution is added to said fuel cell or battery at an amount of between about 0.1 micro liter to 1000 ml per 1 gr of said solid or semi-solid spent fuel.

8. The method according to claim 1, wherein said peroxide precursor is sodium perborate, potassium perborate, sodium persulfate, potassium persulfate or any combination thereof.

9. A method of loading and unloading an anode compartment of a metal-air fuel-cell, said method comprises:
    (i) loading said anode compartment with metal-fuel, electrolyte solution and a thickening agent, wherein said thickening agent forms a metal fuel gel in said compartment;
    (ii) electrochemically discharging said cell forming solid and semi-solid spent fuel;
    (iii) adding a liquefier to said anode compartment, wherein said liquefier allows unloading of solid and semi-solid spent fuel; and
    (iv) repeating steps (i) to (iii);
wherein said liquefier is added prior to the discharging step, during the discharging step or following the discharging step, and wherein said liquefier comprises peroxide solution or peroxide precursor.

10. The method according to claim 9, wherein said metal is zinc.

11. The method according to claim 9, wherein said metal-fuel in said anode compartment is reversibly electrochemically generated.

12. The method according to claim 9 wherein said thickening agent is starch, polyvinyl alcohol, poly(acrylic acid), carboxymethylcellulose, a cross-linked polymer gelator, ethylene maleic anhydride copolymer or any combination thereof.

13. The method according to claim 12, wherein said poly(acrylic acid) is carbopol.

14. The method according to claim 9, wherein said liquefier comprises hydrogen peroxide.

15. The method of claim 9, wherein said liquefier comprises a hydrogen peroxide precursor.

16. The method of claim 15, wherein said hydrogen peroxide precursor is sodium perborate, potassium perborate, sodium persulfate, potassium persulfate or any combination thereof.

17. A metal-air fuel cell comprising:
    (i) an air electrode;
    (ii) an anode compartment comprising metal-fuel;
    (iii) a current collector for said anode;
    (iv) a metal fuel inlet;
    (v) a liquefier inlet; and
    (vi) a spent metal fuel outlet;
    (vii) a liquefier tank, wherein said liquefier tank comprises peroxide solution or peroxide precursor.

18. The cell according to claim 17, wherein said cell further comprises a fuel tank, a spent fuel tank; a mechanical device for unloading liquefied spent fuel or any combination thereof.

19. The cell according to claim 17, wherein said metal-fuel is in a gel form.

20. The cell according to claim 17, wherein said metal is zinc.

21. The cell according to claim 17, wherein said metal fuel comprises a zinc powder, an alkaline electrolyte and a thickening agent.

22. The cell according to claim 21, wherein said thickening agent is a poly (acrylic acid).

23. The cell according to claim 17, wherein said metal fuel in said anode compartment is reversibly electrochemically generated.

* * * * *